United States Patent
Yoon et al.

(10) Patent No.: US 8,918,810 B2
(45) Date of Patent: Dec. 23, 2014

(54) APPARATUS AND METHOD FOR PROVIDING AVAILABLE CODEC INFORMATION

(75) Inventors: Jung-min Yoon, Seoul (KR);
Jun-hyeong Kim, Anyang-si (KR);
Jae-woo Ko, Uiwang-si (KR);
Joung-hoon Choo, Seoul (KR);
Sang-do Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1330 days.

(21) Appl. No.: 11/709,170

(22) Filed: Feb. 22, 2007

(65) Prior Publication Data
US 2007/0277199 A1 Nov. 29, 2007

(30) Foreign Application Priority Data
Apr. 3, 2006 (KR) .................. 10-2006-0030324

(51) Int. Cl.
| | |
|---|---|
| H04N 5/445 | (2011.01) |
| G06F 17/00 | (2006.01) |
| H04N 21/488 | (2011.01) |
| H04N 21/482 | (2011.01) |
| H04N 21/6377 | (2011.01) |
| H04N 21/434 | (2011.01) |
| H04N 21/436 | (2011.01) |
| H04N 21/485 | (2011.01) |
| H04N 5/46 | (2006.01) |

(52) U.S. Cl.
CPC ......... *H04N 5/44543* (2013.01); *H04N 21/488* (2013.01); *H04N 21/4821* (2013.01); *H04N 21/6377* (2013.01); *H04N 21/4348* (2013.01); *H04N 5/46* (2013.01); *H04N 21/43615* (2013.01); *H04N 5/44513* (2013.01); *H04N 21/485* (2013.01)

USPC ............... 725/40; 725/39; 715/221; 715/222

(58) Field of Classification Search
USPC .................. 725/39–40, 44–47; 715/219–221
See application file for complete search history.

(56) References Cited

U.S. PATENT DOCUMENTS

| | | | |
|---|---|---|---|
| 5,946,045 A | 8/1999 | Ozkan et al. | |
| 6,216,152 B1 * | 4/2001 | Wong et al. | 709/203 |
| 6,314,565 B1 * | 11/2001 | Kenner et al. | 717/171 |
| 6,337,715 B1 | 1/2002 | Inagaki et al. | |
| 6,421,726 B1 * | 7/2002 | Kenner et al. | 709/225 |
| 6,600,738 B1 * | 7/2003 | Alperovich et al. | 370/352 |
| 6,615,252 B1 * | 9/2003 | Oka et al. | 709/219 |
| 2001/0026287 A1 * | 10/2001 | Watanabe | 345/764 |
| 2002/0035726 A1 * | 3/2002 | Corl | 725/39 |
| 2005/0177858 A1 * | 8/2005 | Ueda | 725/105 |

FOREIGN PATENT DOCUMENTS

| | | |
|---|---|---|
| CN | 1370315 A | 9/2002 |
| KR | 1999-013612 A | 2/1999 |
| KR | 10-2001-0041096 A | 5/2001 |
| KR | 10-0303374 B1 | 7/2001 |
| KR | 10-2002-0015431 A | 2/2002 |
| KR | 10-2003-0052819 A | 6/2003 |
| KR | 10-2006-0020420 A | 3/2006 |

\* cited by examiner

*Primary Examiner* — An Son P Huynh

(74) *Attorney, Agent, or Firm* — Sughrue Mion, PLLC

(57) ABSTRACT

An apparatus for providing available codec information, includes a receiving unit that receives electronic program guide (EPG) data transmitted by a broadcasting operator; a codec-management unit that checks the position information of the codec based on the received EPG data, and manages the point of downloading time of the codec; an interface-generation unit that generates the position information of the checked codec, and provides the information to the EPG screen; and a display unit that displays the EPG screen including the position information of the codec.

11 Claims, 7 Drawing Sheets

|  | 07:00 | 08:00 | 09:00 |
|---|---|---|---|
| Ch.1 | Morning News | | New World |
| CH.2 | Private Lian | | LOST |
| CH.3 | Reality Show | | |
| CH.4 | HR | Friends | |

APPARATUS AND METHOD FOR PROVIDING AVAILABLE CODEC INFORMATION

CROSS-REFERENCE TO RELATED APPLICATION

This application is based on and claims priority from Korean Patent Application No. 10-2006-0030324 filed on Apr. 3, 2006 in the Korean Intellectual Property Office, the disclosure of which is incorporated herein in its entirety by reference.

BACKGROUND OF THE INVENTION

1. Field of the Invention

Methods and apparatuses consistent with the present invention relate to providing available codec information, and more particularly, to providing available codec information, in which a user can easily recognize available codec information by providing codec information and the information about whether there is a codec to an Electronic Program Guide (EPG) in a digital-broadcasting environment that supports various types of codecs.

2. Description of the Related Art

Recently, as new broadcasting environments such as Internet Protocol (IP) television (TV) and satellite broadcasting appear, services that use various types of codecs are being provided.

Further, broadcasting stations are trying to send high-quality images using various types of codec, but because only MPEG-2 codecs are provided in current TVs, various types of codecs cannot be supported, which is a problem. As such, new TVs that support various types of codecs are appearing.

However, the technology, which effectively informs the system or the user of codec information or information about whether there is codec in the current digital broadcasting environment, has not been developed.

FIGS. 1A and 1B illustrate a related art broadcasting system and EPG screen.

As illustrated in FIG. 1A, a broadcasting operator 11 transmits broadcasting signals using various types of media such as cable, IP, and satellite. As such, a user receives broadcasting signals transmitted by the broadcasting operator 11 using a set-top box 12 or a digital TV (DTV) 13, and views a program (i.e., broadcasting content).

In order to display broadcasting content in such a system, the broadcasting operator 11 provides an EPG screen.

As illustrated in FIG. 1B, a related art EPG screen has a horizontal axis which indicates time, and a vertical axis which indicates each channel, and thus broadcasting content of each channel by certain time slots can be recognized.

EPG data transmitted by the broadcasting operator 11 is parsed, and the parsed information is provided at the EPG screen. The EPG data consists of packets and includes a title of a broadcasting program, a broadcasting time, a channel and other broadcasting information. The EPG data is transmitted to the set-top box 12 or the DTV 13.

In the operation of a broadcasting system, the broadcasting operator 11 first transmits EPG data, where the information such as the title of the broadcasting program, the time, and the channel is included, for the delivery of the EPG content. As such, the set-top box 12 or the DTV 13, which receives the EPG, parses the data, and displays the data in the DTV 13.

Next, in the case where the user selects a channel through the displayed EPG channel, the MPEG-2-type broadcasting content, which is transmitted by the broadcasting operator 11, is transmitted via various networks such as a satellite, an IP and a cable. The MPEG-2 is decoded in the set-top box 12 or the DTV 13, then is displayed in the screen.

However, because the current set-top box 12 or the DTV 13 support only MPEG-2, it is impossible for the broadcasting operator 11 to provide high-quality services using a new type of codec.

Korean Unexamined Patent Application No. 1999-013612 (entitled "Broadcasting-Receiving Apparatus and Data-Broadcasting Method") discloses an apparatus and method that shows whether there is a decoding software program in the program through the EPG. However, it does not mention a technology that searches the position of the codec, changes a result value on the position of the codec into an expression of time which can be easily recognized by a user, and displays the expression on the screen.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and a method which allow a user to easily recognize available codec information by providing codec information and the information about whether there is codec to an EPG in a digital broadcasting environment.

According to an aspect of the present invention, there is provided an apparatus for providing available codec information, the apparatus including a receiving unit that receives EPG data transmitted by a broadcasting operator; a codec-management unit that checks the position information of the codec based on the received EPG data, and manages the point of downloading time of the codec; an interface-generation unit that generates the position information of the checked codec, and provides the information to the EPG screen; and a display unit that displays the EPG screen where the position information of the codec is included.

According to another aspect of the present invention, there is provided a method of providing available codec information, the method including receiving EPG data transmitted by a broadcasting operator; parsing the received EPG data and extracting codec information; checking the position information of the codec based on the extracted codec information; and providing the extracted codec information and the position information of the checked codec to the EPG screen.

BRIEF DESCRIPTION OF THE DRAWINGS

The above and other aspects of the present invention will become apparent by describing in detail exemplary embodiments thereof with reference to the attached drawings in which.

DETAILED DESCRIPTION OF EXEMPLARY EMBODIMENTS OF THE INVENTION

Figures 1A, 1B:
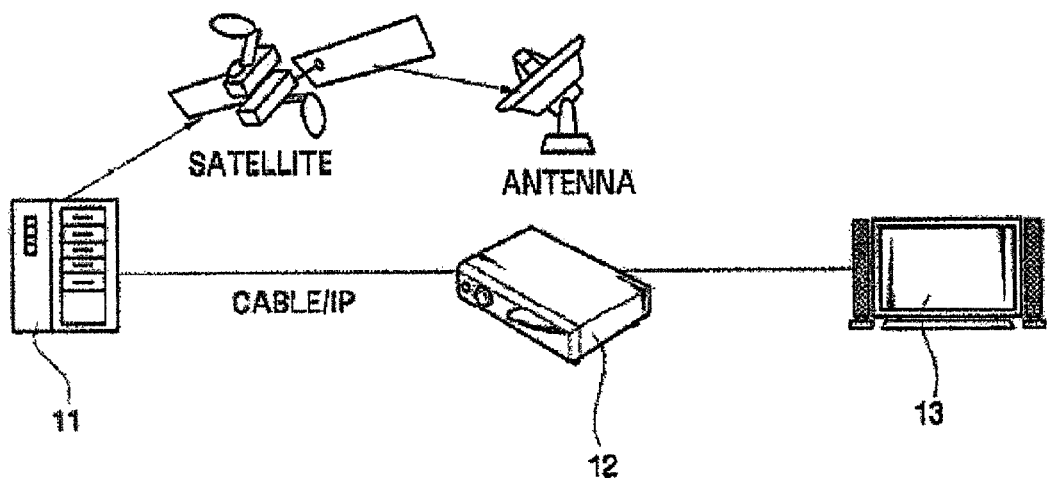
FIGS. 1A and 1B illustrate a related broadcasting system and EPG screen.

Exemplary embodiments of the present invention will be described in detail with reference to the accompanying drawings.

The present invention may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Figure 2:
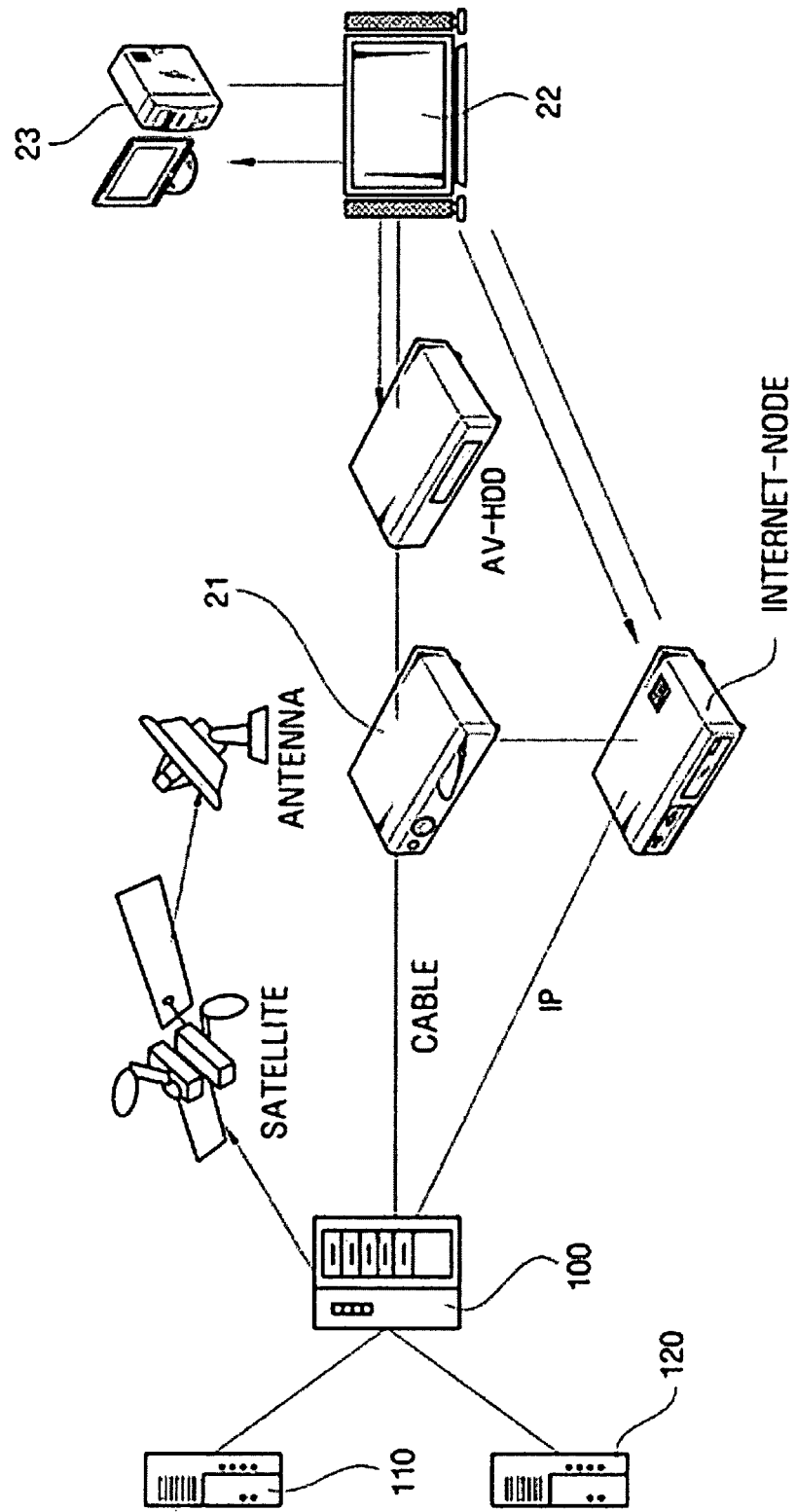
FIG. 2 illustrates a system that includes an apparatus for providing available codec information according to an exemplary embodiment of the present invention.

FIG. 2 illustrates a system that includes an apparatus for providing available codec information according to an exemplary embodiment of the present invention. Here, it is assumed that there is a TV platform where various types of codec can be used, and all audio/video (AV) and IP devices are connected by a network.

As illustrated, a broadcasting operator 100 includes a content server 110 and a codec server 120, and is connected to a user's home via various networks such as satellite, a cable and/or IP networks.

Further, a set-top box 21, a DTV 22, and a personal computer (PC) 23 are connected in a network in the user's home. Here, the DTV 22 is an apparatus for providing available codec information, i.e., a multimedia-reproduction apparatus, and the multimedia-reproduction apparatus will be described later with reference to FIG. 3.

Further, the DTV 22 can reproduce not only broadcasting content transmitted by an outside broadcasting operator 100, but also all content (e.g., broadcasting content and general video content) existing in the PC 23, an AV-hard disk drive (HDD) and others, and a codec stored in the PC 23 and AV-HDD can be shared.

Hence, in the case where there is no codec that is necessary for reproducing broadcasting content and video content in the set-top box 21 or the DTV 22, the codec in other devices in the home network and the outside codec server 120 can be shared.

For example, if the broadcasting operator 100 transmits broadcasting content and EPG data to the set-top box 21 or the DTV 22, the DTV 22 (or the set-top box 21) parses the transmitted EPG data, and extracts codec information based on the parsed EPG data. Here, the codec information includes the codec name, the server address that holds the codec, and addition information about the codec. The EPG data packet will be described later with reference to FIG. 4.

Next, the DTV 22 checks whether there is the codec based on the extracted codec information. Here, the checking is to determine whether the codec is within the DTV 22, on the home network, or on the outside network, and to search the position of the codec.

Next, the information about whether there is the codec is provided through a user interface (UI). The EPG screen will be described later with reference to FIG. 4.

Figure 3:
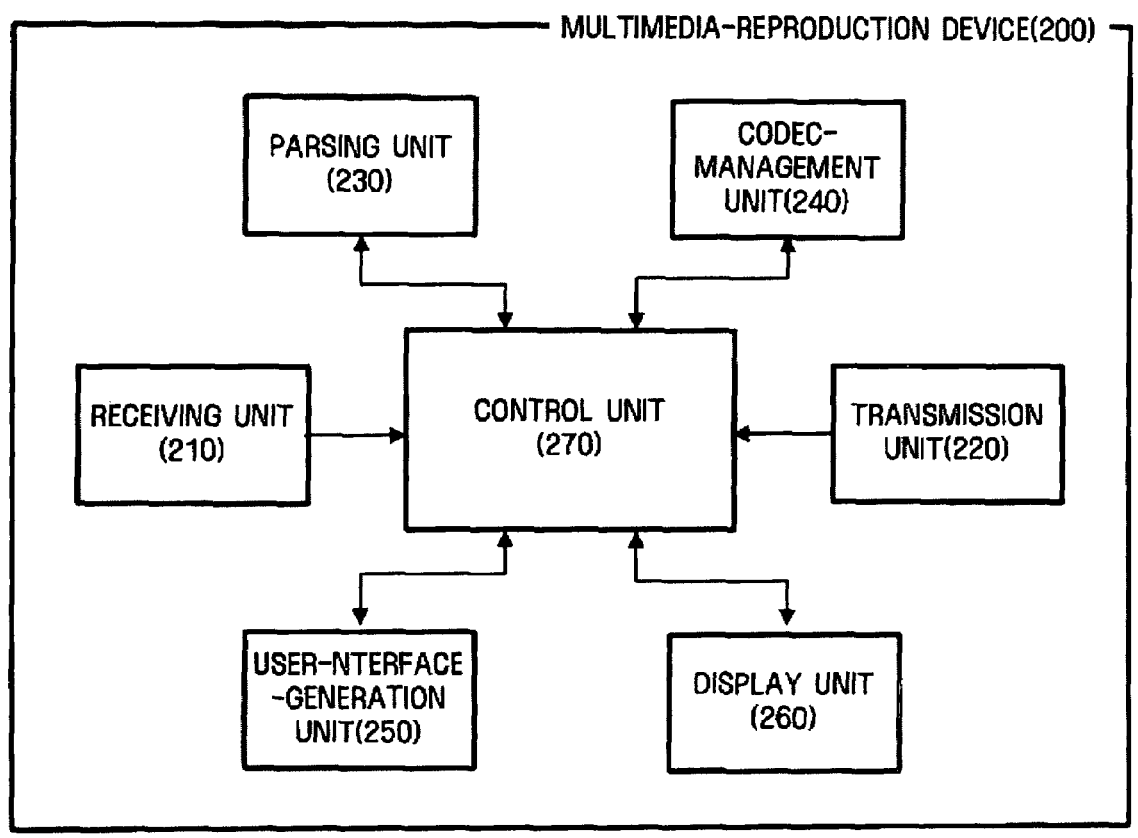
FIG. 3 is a block diagram illustrating an apparatus for providing available codec information according to another exemplary embodiment of the present invention.

FIG. 3 is a block diagram illustrating an apparatus for providing available codec information according to another exemplary embodiment of the present invention.

As illustrated, a multimedia-reproduction device 200 that provides available codec information includes a receiving unit 210, a transmission unit 220, a parsing unit 230, a codec-management unit 240, a user-interface-generation unit 250, a display unit 260, and a control unit 270. Here, the multimedia-reproduction device 200 can be understood as a DTV.

The term "unit", as used herein, means, but is not limited to, a software or hardware component, such as a Field Programmable Gate Array (FPGA) or Application Specific Intergrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The receiving unit 210 receives broadcasting content and EPG data transmitted by the broadcasting operator 100, and receives response signals transmitted from devices existing in the home network, and the codec that reproduces predetermined broadcasting content.

The transmission unit 220 broadcasts a codec-searching message to devices within the home network, and transmits a codec-request message that requests the downloading of a predetermined codec to the devices within the home network and the codec server 120 positioned at the outside network.

The parsing unit 230 analyzes (parses) EPG data input through the receiving unit 210, then provides broadcasting content and the codec information.

The codec-management unit 240 checks whether there is a codec that reproduces predetermined broadcasting content based on the parsed EPG data, i.e., searches the position of the codec based on codec information included in the EPG. Here, the codec-management unit 240 generates a codec-searching message to search the position of the codec, and a codec-request message that requests the downloading of the codec.

For example, in the case where there is no codec necessary for reproducing broadcasting content within the multimedia-production device 200, a searching message that checks whether there is a codec is generated, and is broadcast to multiple devices. Further, the message that requests the downloading of a predetermined codec is generated, and is transmitted to a home network or an outside network.

As such, in the case where the codec-management unit 240 receives the response message to the codec-searching message transmitted from the device in the home network, the desired codec is positioned within another device in the home network, and in the case where the response message to the codec-searching message is not transmitted from the device in the home network, the desired codec is positioned at the codec server 120 existing in the outside network. Here, the searched position information is displayed on the EPG screen so that the user can easily recognize available codec information.

Further, the codec-management unit 240 checks the downloading of the codec based on the point of time and the period of the downloading. Here, the point of time and the period of the downloading can be arbitrarily set and changed.

For example, in the case a user checks the point of time and the period of the codec-downloading, and the downloading is necessary at the moment, a codec-request message is generated and transmitted. Further, if the downloading is not necessary at the moment, the point of time of the downloading is checked at predetermined intervals.

The user-interface-generation unit 250 generates broadcasting content information and available codec information, and provides the information to the EPG screen.

For example, the user-interface-generation unit 250 generates predetermined broadcasting content information, and codec information that reproduces broadcasting content, and codec position information. Here, different colors may be applied in the EPG screen for each codec so that the user can easily recognize the type of codec through the color provided in the EPG.

The display unit 260 displays EPG screen that includes transmitted broadcasting content, and codec information generated by the user-interface-generation unit 250.

Further, the display unit 260 displays a codec-setting menu that can set the point of time and the period of the codec-downloading.

The control unit 270 controls the operation of the units 210 to 260 that constitute the multimedia-reproduction device 200.

Figure 4A:
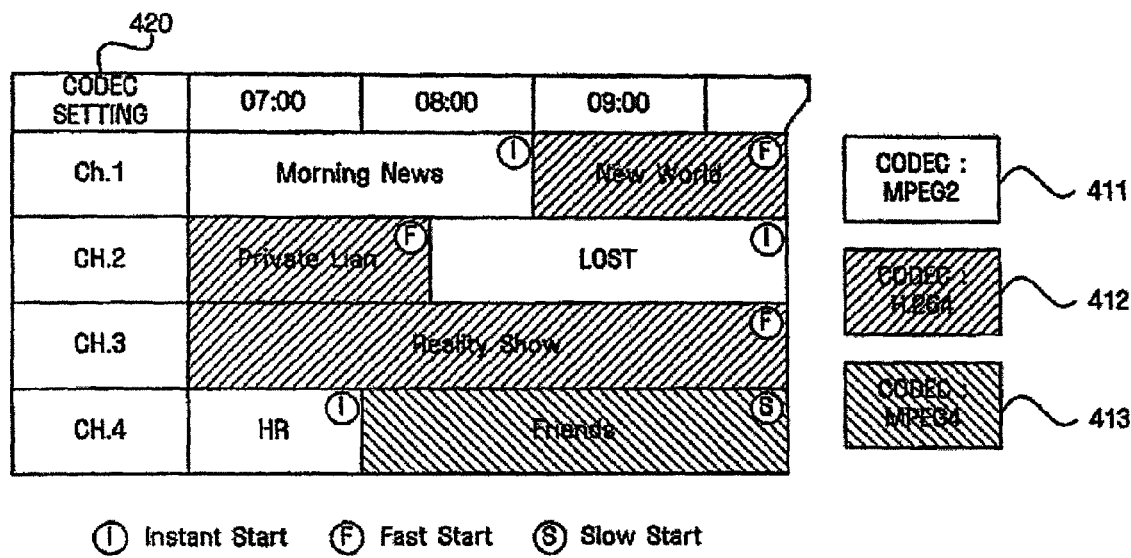
FIGS. 4A and 4B illustrate an EPG screen displayed in an apparatus for providing available codec information according to another exemplary embodiment of the present invention.
Figure 4B:
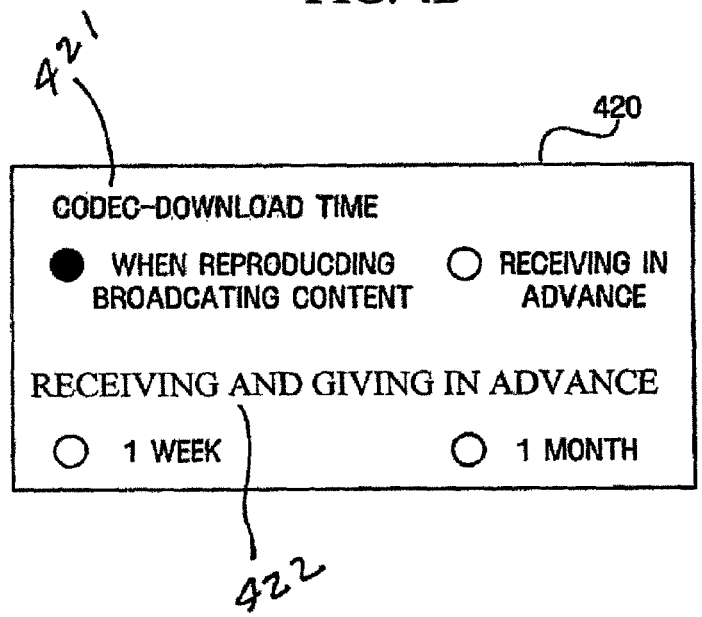

FIGS. 4A and 4B illustrate an EPG screen displayed in an apparatus for providing available codec information according to another exemplary embodiment of the present invention.

As illustrated in FIG. 4A, the vertical axis of the EPG screen indicates each channel. Here, the background color of content provided in each channel is displayed with different color, and each colors represents each codec. In other words, the same color indicates the same codec, and different colors indicate different codecs.

For example, in FIG. 4A, no hatching on a channel content displayed the EPG screen represents an MPEG-2 codec, forward-slanted hatching represents an H.264 codec, and backward-slanted hatching represents an MPEG-4 codec.

Further, codec information divided by each color is provided at the right side of the screen, and if a block 411 to 413 that indicates the codec is selected, more detailed information about the codec is provided. For example, the compression rate and the version information of the codec are provided.

Further, three symbols (Ⓘ, Ⓕ, and Ⓢ) are displayed at predetermined positions of the space where the title information of each broadcasting content is provided, and thus the user can easily recognize the position information of the codec.

First, Ⓘ represents "Instant Start", which means that the codec s in the set-top box 21 or the DTV 22. As such, this means that broadcasting content (or video content) can be promptly reproduced.

Further, Ⓕ represents "Fast Start", which means that the codec is in another device in the home network. As such, this means that because the codec can be transmitted easily, the broadcasting content can be reproduced in a relatively short time.

Further, Ⓢ represents "Slow Start", which means that there is no codec in the home network. As such, the means that the codec should be received based on the address of the codec server 120 included in the EPG data. In other words, this indicates that because the codec should be downloaded from the codec server 120 existing in the outside network, the reproduction time will be relatively late.

Further, if the menu "Codec Setting" 420 is selected, the setting menu that can set the point of time and the period of the codec-downloading is displayed, as illustrated in FIG. 4B.

First, the menu "Codec-Download Time" menu 421 determines the point of time when the codec is going to be downloaded. Here, the menu 421 includes the item "When Reproducing Broadcasting Content" and the item "Receiving In Advance". The items mentioned herein are merely exemplary, and can be set in various points of time.

For example, if the item "When Reproducing Broadcasting Content" is selected, the codec is not downloaded in advance, but the codec is downloaded when reproducing the broadcasting content so as to reproduce the broadcasting. If the item "Receiving In Advance" is selected, the necessary codec is downloaded in advance from the server according to the menu "Receiving and Giving In Advance" that has been set when reproducing other broadcasting content, and is stored.

Further, the menu "Receiving and Giving In Advance" 422 determines up to which time the codec will be downloaded in advance. Here, the menu 422 includes the item "1 Week" and the item "1 Month". The items are merely exemplary, and can be set into various periods.

For example, if the item "1 Week" is selected, codec, which is necessary for reproducing broadcasting content for the following 1 week, will be downloaded in advance. If the item "1 Month" is selected, codec, which is necessary for reproducing broadcasting content for the following 1 month, will be downloaded in advance.

Figure 5:
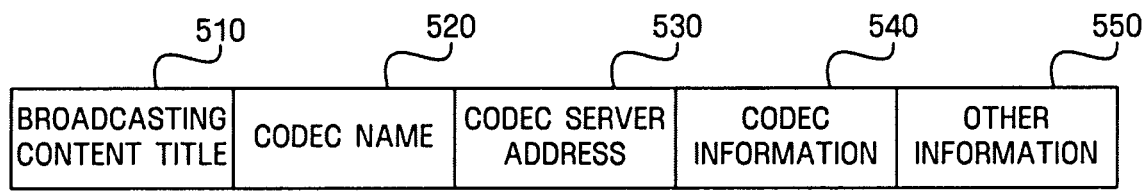
FIG. 5 illustrates an EPG packet that is received at an apparatus for providing available codec information according to another exemplary embodiment of the present invention.

FIG. 5 illustrates an EPG packet that is received at an apparatus for providing available codec information according to another exemplary embodiment of the present invention.

As illustrated, the data packet transmitted by the broadcasting operator 100 includes the title of broadcasting content 510, the name of codec necessary for reproducing the broadcasting content 520, the address of the server from which the codec can be downloaded 530, additional information on the codec 540, and other additional information related with broadcasting content 550.

Hence, after the EPG data packet that includes such information is transmitted, by parsing the packet, the information of the codec can be displayed to the user in the set-top box 21 or the DTV 22 in the home network.

Figure 6:
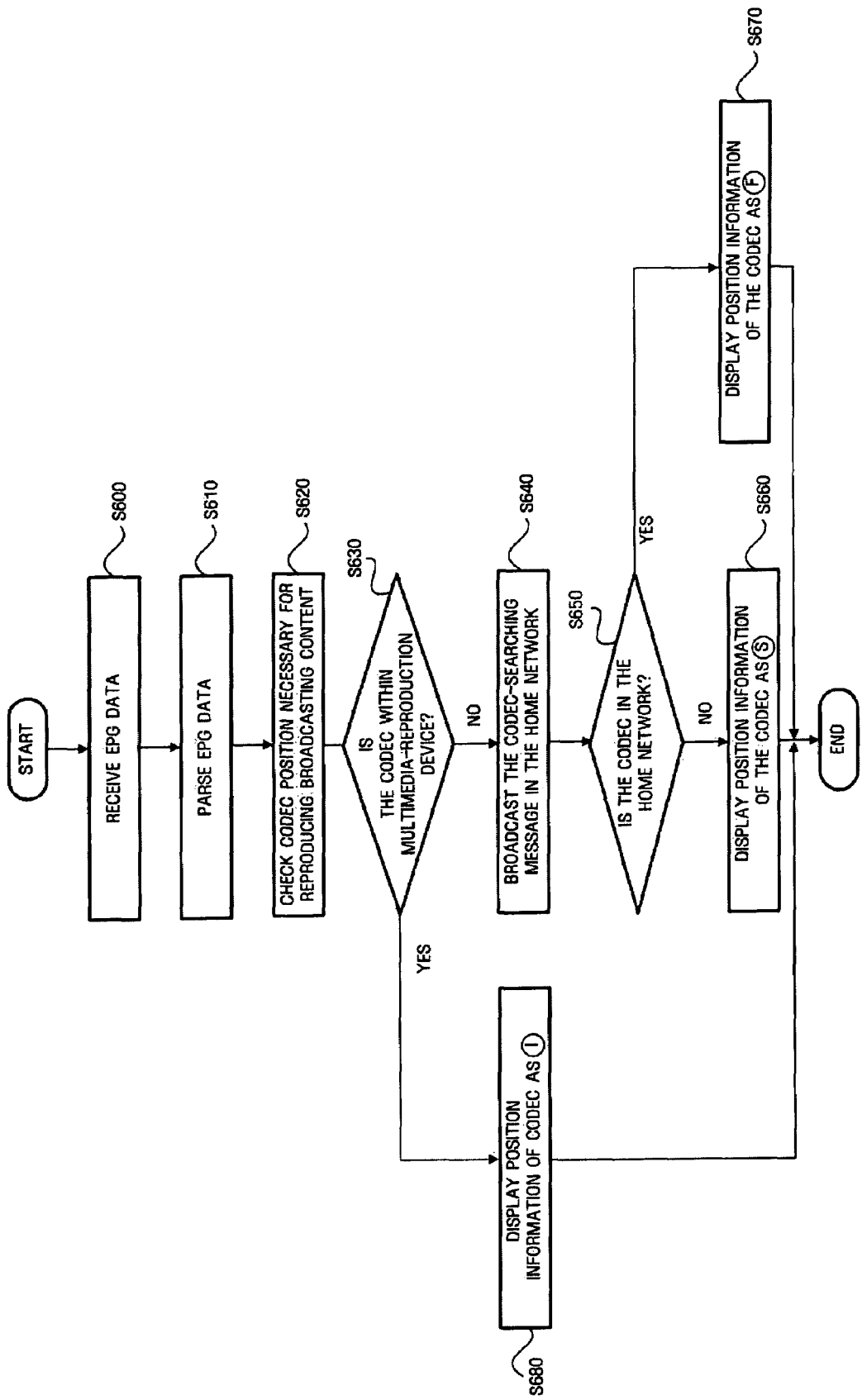
FIG. 6 is a flow chart illustrating a method of providing available codec information according to another exemplary embodiment of the present invention.

FIG. 6 is a flow chart illustrating a method of providing available codec information according to another exemplary embodiment of the present invention. Here, the multimedia-reproduction device 200 receives the EGP data transmitted by the broadcasting operator 100, and it is assumed that the multimedia-reproduction device 200 is the DTV 200.

First, if the broadcasting operator 100 transmits the EPG data, the receiving unit 210 receives the transmitted EPG data (S600), and transmits the received EPG data to the parsing unit 230.

Next, the parsing unit 230 parses the EPG data, and analyzes information on the broadcasting content and codec (S610). Then, the codec-management unit 240 checks the position of the necessary codec in reproducing the predetermined broadcasting content based on the analyzed codec information (S620). Here, the codec can be positioned at the multimedia-reproduction device 200, another device in the home network, and the codec server 120 that is the outside network. Here, according to the position information of the codec, three symbols (Ⓘ, Ⓕ, and Ⓢ), which can be easily recognized by the user, are provided on the EPG screen.

As a result, in the case where there is the codec necessary for reproducing broadcasting content in the multimedia-reproduction device 200 (S630), the control unit 270 requests the user-interface-generation unit 250 to generate the user interface that indicates the position information of the codec. As such, the user-interface-generation unit 250 indicates the position information of the codec at the predetermined position of the space where the broadcasting-content title is displayed (S680). Here, the displayed position information of the codec is Ⓘ (Instant Start).

Further, in the case where there is no codec necessary for reproducing broadcasting content in the multimedia-reproduction device 200. S630, the codec-management unit 240 generates a codec-searching message to find the predetermined codec, and broadcasts the generated message to devices existing in the home network via the transmission unit 220 (S640).

As such, devices existing in the home network receive the broadcast searching message, and searches whether there is the codec. If there is the codec, the response message is transmitted to the multimedia-reproduction device 200.

Next, if the response message is transmitted from the devices existing in the home network, the receiving unit 210 transmits the transmitted response message to the control unit 270, and the control unit 270 requests the user-interface-generation unit 250 to generate the UI that indicates the position information of the codec.

Next, the user-interface-generation unit 250 displays the position information of the codec at the predetermined position of the space where the title of the broadcasting content is displayed (S670). Here, the displayed position information is Ⓕ (Fast Start).

Further, in the case where the response message is not transmitted from devices existing in the home network (S650), the control unit 270 determines that there is no codec in the home network, and requests the user-interface-generation unit 250 to generate the UI that indicates the position information of the codec.

As such, the user-interface-generation unit 250 displays the position information of the codec at the predetermined position of the space where the title of the broadcasting content is displayed (S660). Here, the displayed position information of the codec is Ⓢ Slow Start).

Hence, the information on the codec and the information on the content are displayed on the EPG screen. As such, the user can easily recognize the position information of the codec that reproduces broadcasting content.

Further, the multimedia-reproduction device 200 downloads the codec for reproducing predetermined broadcasting content based on the point of time and the period of the codec-downloading which has been set through the codec-setting menu. The process of downloading codec is described with reference to FIG. 7.

Figure 7:
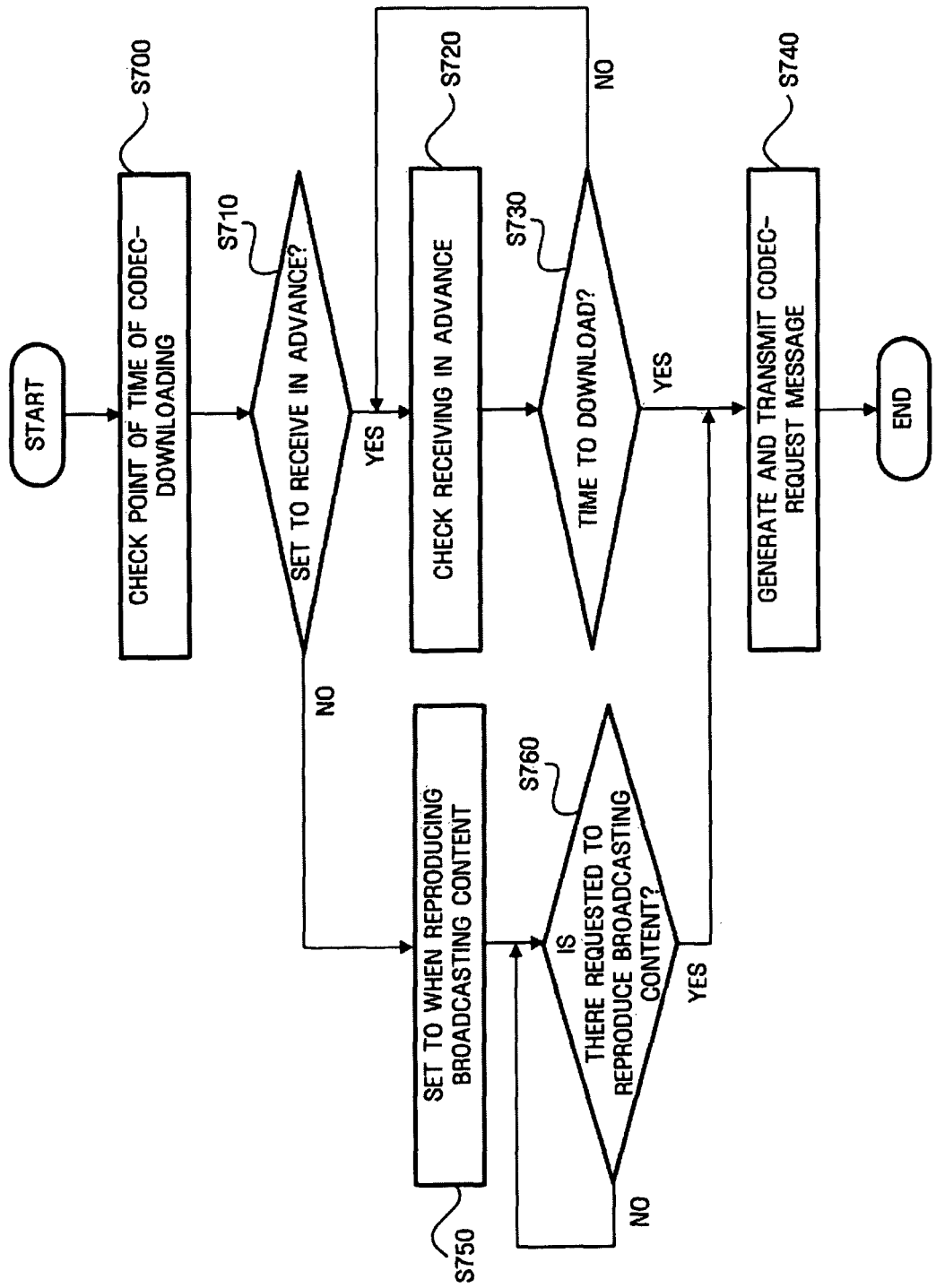
FIG. 7 is a flow chart illustrating the operation that requests the downloading on predetermined codec in a method of providing available codec information according to another exemplary embodiment of the present invention.

FIG. 7 is a flow chart illustrating the operation that requests the downloading on predetermined codec in a method of providing available codec information according to another exemplary embodiment of the present invention.

First, the codec-management unit 240 checks the point of time and the period of the codec-downloading which has been set by the user (S700). Here, the point of time of the codec downloading is divided into "When Reproducing Broadcasting Content" and "Receiving In Advance".

If the point of time of the codec-downloading is set as "Receiving In Advance"), (S710), the codec-management unit 240 checks the period of "Receiving In Advance" (S720). Here, the period of "Receiving in Advance" is "1 Week" or "1 Month".

For example, in the case where the period is "1 Week", and the downloading is needed at the current point of time (S730), the codec-management unit 240 generates a codec-request message, and transmits the generated codec-request message to the address (S740).

For example, the codec-request message generated by the codec-management unit 240 is transmitted to a predetermined device existing in the home network that has transmitted the response message, or the codec server 120 existing in the outside network. Here, the address of the device existing in the home, network can be known through the address information of the transmission device included in the response message, and the address of the codec server 120 can be known through the address information of the codec server included in the EPG data.

Further, in the case where it is not the time for the downloading ("NO" in S730), the codec-management unit 240 repeatedly checks whether the point of time for the downloading has reached per predetermined time.

Further, in the case the point of time of the codec-downloading is not set as "Receiving In Advance" (S710), i.e., the point of time is set as "When Reproducing Broadcasting Content" (S750), the control unit 270 determines whether the user requests the reproduction of the predetermined broadcasting content.

If the reproduction of the predetermined broadcasting content is requested by the user ("YES" in S760), the codec-management unit 240 generates the codec-request message, and transmits the generated codec-request message to the address (S740).

Further, in the case where the reproduction of the predetermined broadcasting content is not requested ("NO" in S760), the control unit 270 checks whether the signal that requests the reproduction of the content is received from the user.

Another exemplary embodiment is described with reference to FIG. 4A, assuming that a user sets the point of time of the codec-downloading as "When Reproducing Broadcasting Content".

First, the user checks a broadcasting content (a program) and the position information of the codec of the broadcasting content. In other words, the user checks whether the codec indicated in the broadcasting content can be promptly downloaded and executed, and it takes predetermined amount of time for the downloading, then selects the reproduction of the broadcasting content (e.g., Morning News).

As such, because the codec that reproduces the selected broadcasting content is positioned at the DTV 22, the broadcasting content is promptly reproduced.

In the case where the codec of the selected broadcasting content (e.g., Friends) is positioned at the codec server 120 in the outside network, the broadcasting content should be reproduced after downloading the codec that reproduces the broadcasting content, and thus it takes predetermined time to reproduce the broadcasting content.

Hence, in the case the user wants to view the broadcasting content quickly, after checking the EPG screen, the user needs to select the broadcasting content in which the codec position information is Ⓘ.

It should be understood by those of ordinary skill in the art that various replacements, modifications and changes may be made in the form and details without departing from the spirit and scope of the present invention as defined by the following claims. Therefore, it is to be appreciated that the above described exemplary embodiments are for purposes of illustration only and are not to be construed as limitations of the invention.

The method and apparatus of the present invention may have the following advantages.

First, in the digital broadcasting environment where various types of codec are used, the information about broadcasting content and the information about codec can be easily delivered to a user.

Second, by displaying different colors on EPG screen by types of codec that reproduces broadcasting content, the user can easily recognize available codec.

What is claimed is:

1. An apparatus for providing available codec information, the apparatus comprising:
   a receiving unit that receives electronic program guide (EPG) data;
   a parsing unit that parses the received EPG data;
   a codec-management unit that extracts codec information used in broadcasting content based on the parsed EPG data, and searches whether the extracted codec information is stored in the apparatus;
   an interface-generation unit that generates a symbol indicating position information of a codec according to the search result, and provides the generated symbol to an EPG screen; and
   a display unit that displays the EPG screen including the codec information and the generated symbol.

2. The apparatus of claim 1, wherein the EPG data comprises a title of broadcasting content, a name of the codec that reproduces the broadcasting content, a downloading address of the codec, information about the codec, and available codec information that includes broadcasting content information.

3. The apparatus of claim 1, wherein the codec is included in a device within a home network or outside the home network.

4. The apparatus of claim 1, wherein the codec-management unit generates a searching message that checks whether the codec exists, and a codec-request message that requests the downloading of the codec, in order to check the position information of the codec.

5. A method of providing available codec information, the method comprising:
   receiving, at a multimedia-reproduction device, electronic program guide (EPG) data;
   parsing the received EPG data and extracting codec information used in broadcasting content from the parsed EPG data;
   searching whether the extracted codec information is stored in the multimedia-reproduction device; and
   generating a symbol indicating position information of a codec according to the search result, and displaying the generated symbol and the codec information on an EPG screen.

6. The method of claim 5, wherein the EPG data comprises a title of broadcasting content, a name of the codec that reproduces the broadcasting content, a downloading address of the codec, information about the codec, and available codec information that includes broadcasting content information.

7. The method of claim 5, wherein the codec is included in a device within a home network or outside the home network.

8. The method of claim 5, wherein the providing the extracted codec information and the position information of the codec to the EPG screen comprises displaying a symbol indicating that the codec exists in a multimedia-reproduction device on the EPG screen if it is determined that the codec exists in the multimedia-reproduction device as a result of the checking the position information of the codec based on the extracted codec information.

9. The method of claim 6, further comprising:
   broadcasting a searching message to search for the codec in devices existing in a home network if it is determined that the codec does not exist in the multimedia-reproduction device as a result of the checking the position information of the codec based on the extracted codec information;
   receiving a response message transmitted from a device existing in the home network that received the broadcast searching message; and
   determining the position of the codec as within the home network based on the response message,
   wherein the providing the extracted codec information and the position information of the codec to the EPG screen comprises displaying symbol indicating that the codec is in the device in the home network on the EPG screen.

10. The method of claim 9, further comprising:
    determining the position of the codec as not being within the home network if the response message is not received from the device existing in the home network,
    wherein the providing the extracted codec information and the position information of the codec to the EPG screen comprises displaying symbol indicating that the codec is not within the home network on the EPG screen.

11. The method of claim 5, further comprising:
    checking a point of time and a period of downloading of the codec; and
    requesting the downloading of the codec based on the point of time and the period of the downloading of the codec.

* * * * *